March 10, 1925.
L. E. POPPE
1,529,373
BRAKE BAND LINING AND METHOD OF MAKING SUCH LINING
Filed Feb. 16, 1923
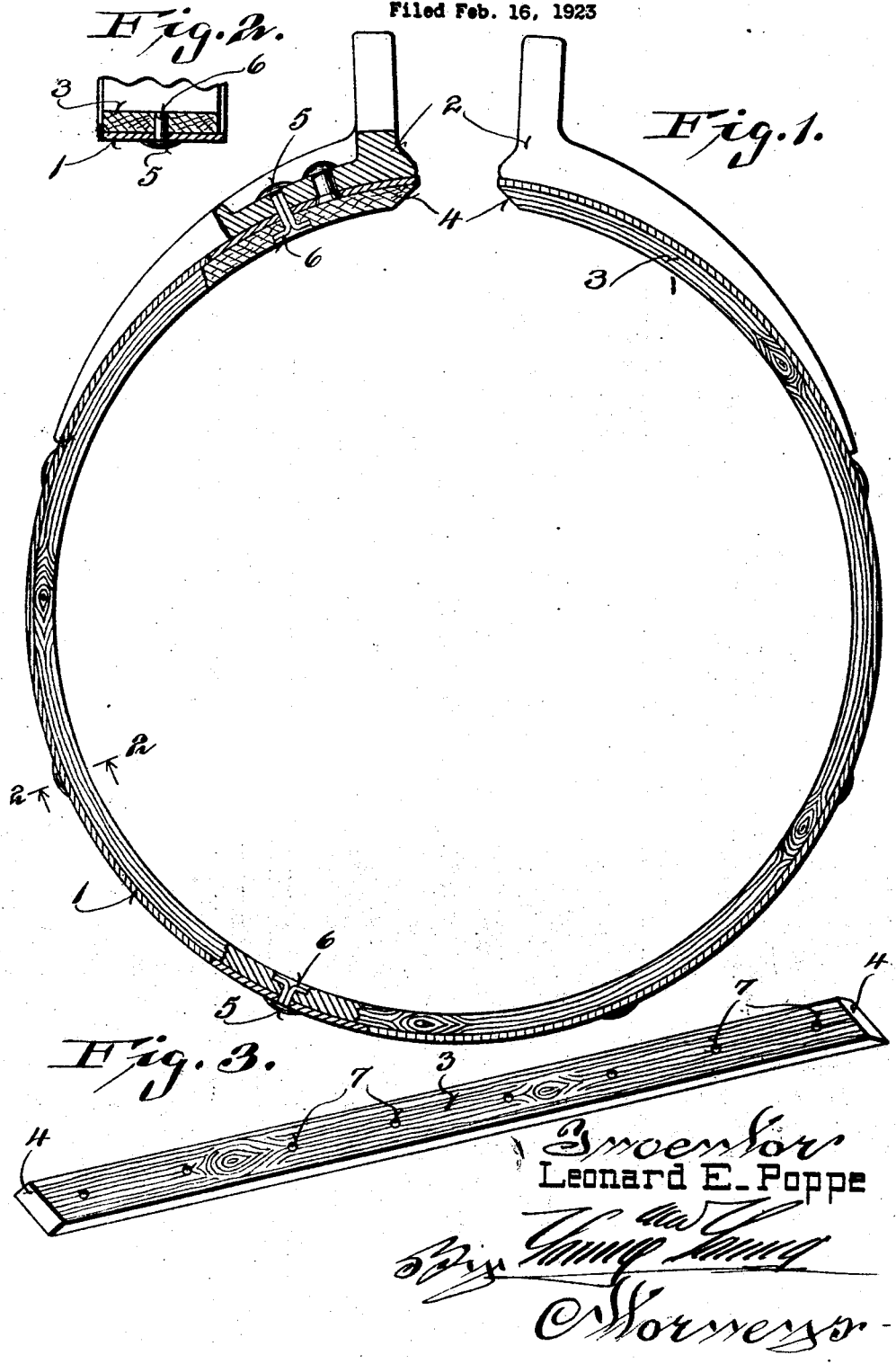

Patented Mar. 10, 1925.

1,529,373

UNITED STATES PATENT OFFICE.

LEONARD E. POPPE, OF FALL RIVER, WISCONSIN.

BRAKE-BAND LINING AND METHOD OF MAKING SUCH LINING.

Application filed February 16, 1923. Serial No. 619,405.

*To all whom it may concern:*

Be it known that I, LEONARD E. POPPE, a citizen of the United States, and resident of Fall River, in the county of Columbia and State of Wisconsin, have invented certain new and useful Improvements in Brake-Band Linings and Methods of Making Such Linings; and I do hereby declare that the following is a full, clear, and exact description thereof.

This invention relates to brake band linings or transmission band linings and to a process of making such linings.

In linings for brake bands, and for similar bands such as the transmission bands of certain types of automobiles employing planetary gearing, considerable difficulty has been encountered due primarily to two main causes, namely, extremely rapid rate at which the lining was worn away and the sloughing off or breaking off of portions of the lining with the corresponding clogging of the associated mechanism. These defects, therefore, not only interfered with the smooth operation of the brake or equivalent mechanism, but interfered with the efficient operation of the associated mechanism as well. A further source of trouble has been the clogging up of the bands and lining adjacent the split portion or opening portion of the band. At this point the worn portions of the band and the relatively quiet or stagnant oil clog and seriously interfere with the operation of the brake band or equivalent device.

This invention is designed to overcome the above noted defects, and objects of such invention are, therefore, to provide a lining for a brake band which will not slough off or break off, which has an extremely long life, which will not gum up and accumulate trash, dried oil and other material, and which will provide the smooth, even operation so much desired in this type of mechanism.

Further objects are to provide a process by which a lining for brake bands, transmission bands and similar devices may be readily and cheaply produced, and to provide a process which will employ relatively cheap material and render such material eminently suitable for the purpose intended.

An embodiment of the invention is shown in the accompanying drawings, in which—

Figure 1 is a sectional view through a brake band or a transmission band.

Figure 2 is a transverse sectional view on a line 2—2 of Figure 1.

Figure 3 is a perspective view of the finished lining strip as it appears when detached from the band.

In the following description, and in the claims, the term "brake band" will be employed to avoid needless enumerations, but it is intended that such term shall include transmission bands, brake bands and other similar devices.

Referring more particularly to the drawings, it will be seen that the brake band comprises a resilient flexible metallic band 1 which is split and provided with reinforcing portions terminating in juxtaposed lugs 2.

This band is lined with a wooden lining 3, which is provided with inwardly bevelled ends 4 adjacent the split portion of the band. It is held in place by means of rivets whose heads 5 are preferably positioned upon the outer side of the band and whose spread or flattened ends 6 are located within recesses below the inner surface of the lining. These rivets may be forced through the lining, if desired, or suitable apertures 7 (see Figure 3) may be provided for their reception.

The lining 3, as stated, is composed of wood and is extremely flexible and is oil impregnated.

In practicing the process contemplated by this invention, wood having uniform elongated grain structure is employed. One of the varieties of wood found eminently suitable for this use is elm. This wood is preferably taken in the form of the veneer cylinder which is cut from the outer portion of a cylindrical piece of wood. The wood is cut into lengths, as indicated in Figure 3, of the required thickness and the ends bevelled, as indicated at 4. If desired, holes 7 may be drilled for the reception of the securing means. This wood may be steamed to render it more pliant, if desired. It is, however, thoroughly boiled in oil so as to expel the moisture and to render the wood waterproof and extremely flexible and tough. It is found that during this boiling process the oil thoroughly penetrates all portions of the strips and materially alters the original characteristics of the wood.

After the strips have been boiled, they are removed and allowed to dry. It is to be noted, however, that they retain a large percentage of oil and maintain their flexibility. It is, of course, understood that wood with the grain running lengthwise of the strip and free from knots and other blemishes is employed.

It is intended that these strips shall be sold as a separate article; for instance, they may be supplied in packages containing any desired number and retailed through jobbers. It is also intended that finished bands shall be sold to the purchasers.

As previously stated, the rivets or other securing means may be passed through the apertures in the lining. However, when the lining has been produced in the manner described, it is found that the rivets can be readily forced through such lining without providing any holes therefor and without any danger of splitting the lining.

It will thus be seen that a brake band lining has been provided which has an extremely long life, which has an even and smooth action and which will not slough off. It will further be seen that the brake band will not clog up.

It will also be seen that an extremely simple and efficacious process has been provided by which brake band linings may be made in a cheap and rapid manner.

In an actual test conducted, the brake band lining has been found to possess all of the above noted characteristics; in fact, after continuous use during a period of about six months, no evidence of wear could be detected.

Although the invention has been described in considerable detail, it is to be understood that the detailed disclosure is to be interpreted as illustrative rather than limiting, and that the invention is to be limited only as claimed.

I claim:

1. A brake band comprising a split flexible ring, a lining located within the ring and having inwardly bevelled ends adjacent the split portion of said ring, and a plurality of fasteners joining said lining and ring, said lining comprising an elongated oil-impregnated strip of wood with the grain running longitudinally thereof.

2. A lining for a brake band comprising an elongated strip of oil-impregnated wood having the grain running longitudinally thereof.

3. A lining for a brake band comprising an elongated strip of wood with the moisture removed, said wood being oil-impregnated.

4. The method of forming brake band linings which comprises cutting veneer wood into lengths with the grain running lengthwise, and boiling such strips in oil, whereby the moisture is driven off and the wood becomes oil-impregnated.

5. A brake band comprising a split flexible ring, an oil impregnated wood lining having the grain running lengthwise, said strip having the moisture removed therefrom, and a series of headed rivets extending through the ring and through the lining with the heads located on the outer side of said ring, said rivets having split inner ends positioned below the inner surface of said lining.

In testimony that I claim the foregoing I have hereunto set my hand at Fall River, in the county of Columbia, and State of Wisconsin.

LEONARD E. POPPE.